US012703996B2

(12) United States Patent
Minsley et al.

(10) Patent No.: US 12,703,996 B2
(45) Date of Patent: Aug. 11, 2026

(54) CYLINDER LOCK

(71) Applicant: DAVINCI LOCK LLC, Raleigh, NC (US)

(72) Inventors: Bradford A. Minsley, Raleigh, NC (US); Clifton P. Minsley, Raleigh, NC (US)

(73) Assignee: DAVINCI LOCK LLC, Raleigh, NC (US)

( * ) Notice: Subject to any disclaimer, the term of this patent is extended or adjusted under 35 U.S.C. 154(b) by 0 days.

(21) Appl. No.: 19/308,590

(22) Filed: Aug. 25, 2025

(65) Prior Publication Data

US 2026/0055640 A1 Feb. 26, 2026

Related U.S. Application Data

(60) Provisional application No. 63/686,346, filed on Aug. 23, 2024.

(51) Int. Cl.
*E05B 13/10* (2006.01)
*E05B 9/04* (2006.01)
(Continued)

(52) U.S. Cl.
CPC .............. *E05B 13/105* (2013.01); *E05B 9/04* (2013.01); *E05B 55/00* (2013.01); *E05B 55/005* (2013.01);
(Continued)

(58) Field of Classification Search
CPC .... E05B 1/0038; E05B 9/04; E05B 2009/004; E05B 2009/006; E05B 2009/046;
(Continued)

(56) References Cited

U.S. PATENT DOCUMENTS 1,640,935 A 8/1927 Hatch
1,951,418 A 3/1934 Jacobi
(Continued)

FOREIGN PATENT DOCUMENTS

ES 1294372 U 9/2022
GB 2496911 B 9/2017
WO 2020/183046 A1 9/2020

OTHER PUBLICATIONS

International Searching Authority, International Search Report and Written Opinion, International Application No. PCT/US2025/043351, Oct. 14, 2025.
(Continued)

*Primary Examiner* — Christopher J Boswell
(74) *Attorney, Agent, or Firm* — Williams Mullen; Thomas F. Bergert

(57) ABSTRACT

Embodiments of a cylinder lock include a main body component and an extension component, wherein a locking arrangement can be employed to move a locking element at the back of the extension component to lock or unlock the extension component from a lock structure. Embodiments of the present disclosure further provide a cylinder lock with a lock adapter having a body and a biased catching mechanism operable to fit within the body near a back end of the lock adapter when in the retracted position and further operable to extend outwardly of the lock adapter body when in the extended position. The catching mechanism can be biased in the extended position and movable to the retracted position by a plunger. The plunger can be moved manually and can be locked in position using a lock such as a padlock with a shackle.

18 Claims, 7 Drawing Sheets

(51) Int. Cl.
*E05B 55/00* (2006.01)
*E05B 65/00* (2006.01)
*E05B 67/38* (2006.01)

(52) U.S. Cl.
CPC ........ *E05B 65/0021* (2013.01); *E05B 67/383* (2013.01); *E05B 2009/046* (2013.01)

(58) Field of Classification Search
CPC ...... E05B 13/105; E05B 55/00; E05B 55/005; E05B 55/12; E05B 65/0021; E05B 67/38; E05B 67/383; E05B 73/0082
See application file for complete search history.

(56) References Cited

U.S. PATENT DOCUMENTS

| | | | | |
|---|---|---|---|---|
| 2,046,831 | A * | 7/1936 | Lowe | E05B 29/00 70/369 |
| 3,659,444 | A | 5/1972 | Wellekens | |
| 3,916,657 | A | 11/1975 | Steinbach | |
| 3,919,866 | A * | 11/1975 | Lipschutz | E05B 17/04 70/81 |
| 4,112,820 | A | 9/1978 | Conger et al. | |
| 4,688,405 | A | 8/1987 | Epstein | |
| 5,119,649 | A * | 6/1992 | Spence | E05B 67/003 70/58 |
| 5,586,459 | A | 12/1996 | Bullock | |
| 5,722,275 | A * | 3/1998 | Price | E05B 13/105 70/379 R |
| 5,724,840 | A | 3/1998 | DiVito | |
| 5,921,119 | A | 7/1999 | Myers | |
| 5,931,032 | A | 8/1999 | Gregory | |
| 6,098,434 | A | 8/2000 | Liou | |
| 6,257,029 | B1 * | 7/2001 | Liao | E05B 73/0005 70/57 |
| 6,477,872 | B1 | 11/2002 | Denton | |
| 6,758,069 | B2 * | 7/2004 | Derman | E05B 73/0005 70/58 |
| 6,880,373 | B2 * | 4/2005 | Ling | E05B 73/0082 70/57.1 |
| 7,234,326 | B1 * | 6/2007 | Lu | E05B 73/0082 70/57 |
| 7,444,844 | B1 | 11/2008 | Lee | |
| 7,958,757 | B1 | 6/2011 | Lee | |
| 8,171,762 | B2 * | 5/2012 | Hsiao | E05B 73/0082 70/58 |
| 8,316,675 | B2 | 11/2012 | Yang | |
| 8,474,290 | B2 | 7/2013 | Terhaar | |
| 9,222,283 | B1 | 12/2015 | Zhang | |
| 9,260,883 | B2 | 2/2016 | Raty | |
| 10,017,959 | B2 * | 7/2018 | Perrins | E05B 65/0021 |
| 10,669,746 | B2 | 6/2020 | Nguyen | |
| 10,851,563 | B1 | 12/2020 | Zhang | |
| 11,131,119 | B2 | 9/2021 | Hwang | |
| 11,913,250 | B2 | 2/2024 | Lee | |
| 12,044,037 | B2 | 7/2024 | Xiang | |
| 12,305,421 | B2 * | 5/2025 | Pollnow | E05B 13/105 |
| 2008/0289379 | A1 * | 11/2008 | Martin | E05B 9/04 70/375 |
| 2018/0258667 | A1 | 9/2018 | Lehner, Jr. et al. | |
| 2022/0243499 | A1 | 8/2022 | Wu | |
| 2023/0127631 | A1 | 4/2023 | Li | |

OTHER PUBLICATIONS

International Searching Authority, International Search Report and Written Opinion, International Application No. PCT/US2025/043349, Oct. 6, 2025.
U.S. Patent and Trademark Office, Office Action, U.S. Appl. No. 19/308,591, filed Nov. 25, 2025.
U.S. Patent and Trademark Office, Office Action, U.S. Appl. No. 19/348,188, Jan. 26, 2026.
U.S. Patent and Trademark Office, Office Action, U.S. Appl. No. 19/308/591, Feb. 18, 2026.

* cited by examiner

Fig. 7
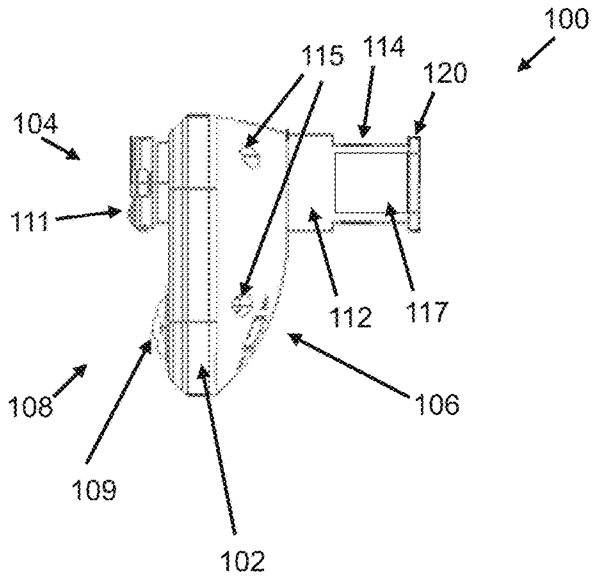
Fig. 8
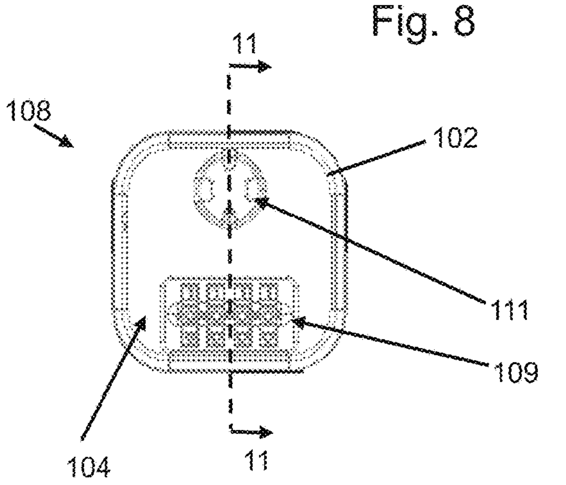
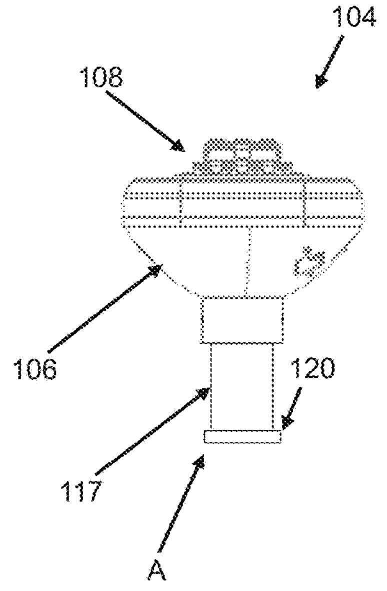
Fig. 9
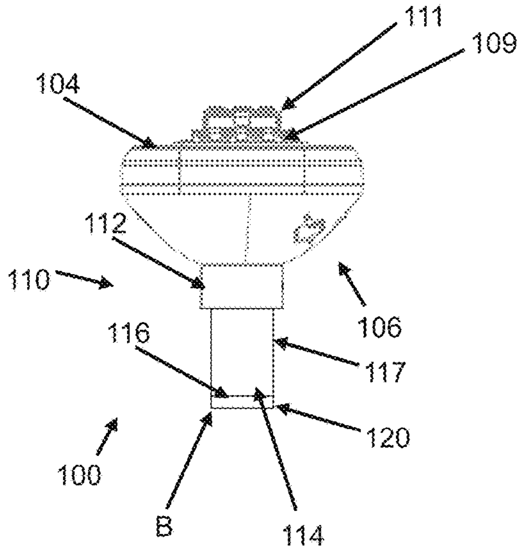
Fig. 10

CYLINDER LOCK

CROSS-REFERENCE TO RELATED APPLICATIONS

This application claims priority to U.S. Provisional Patent Application No. 63/686,346 filed on Aug. 23, 2024, the contents of which are incorporated by reference herein in its entirety.

BACKGROUND AND SUMMARY

Door locks come in a variety of shapes and sizes. Certain doors such as storage facility doors may be provided with a bolt latch having an opening when in a lockable position for the insertion of a cylinder lock. In some cases, it is desirable to employ a padlock or other lock with such door locks without having to modify the door lock structure.

Embodiments of the present disclosure provide a cylinder lock and lock adapter that permit the use of a padlock or other lock in circumstances such as above without having to modify the door lock structure. Embodiments as described herein provide a cylinder lock with a main body component and an extension component, wherein a locking arrangement can be employed to move a locking element at the back of the extension component to lock or unlock the extension component from a lock structure having a latch or hasp maintained within a plate frame. Embodiments of the present disclosure further provide a cylinder lock with a lock adapter having a body and a biased catching mechanism operable to fit within the body near a back end of the lock adapter when in the retracted position and further operable to extend outwardly of the lock adapter body when in the extended position. The catching mechanism can be biased in the extended position and movable to the retracted position by a plunger. The plunger can be moved manually and can be locked in position using a lock such as a padlock with a shackle.

BRIEF DESCRIPTION OF THE DRAWINGS

FIG. 7 is a left side view of a cylinder lock according to embodiments of the present disclosure.

FIG. 8 is a front view of the cylinder lock of FIG. 7.

FIG. 9 is a bottom view of the cylinder lock of FIG. 7, showing a movable locking element in the locked position.

FIG. 10 is a bottom view of the cylinder lock of FIG. 7, showing a movable locking element in the unlocked position.

DETAILED DESCRIPTION OF EMBODIMENTS

Figure 1:
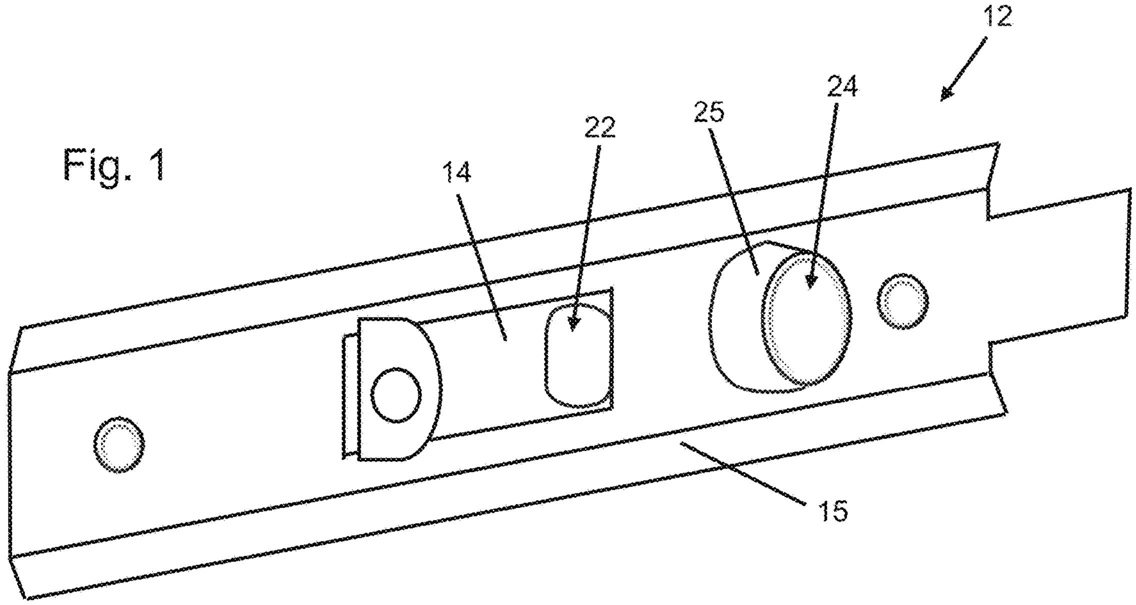
FIG. 1 is a front perspective view of a lock structure.
Figure 2:
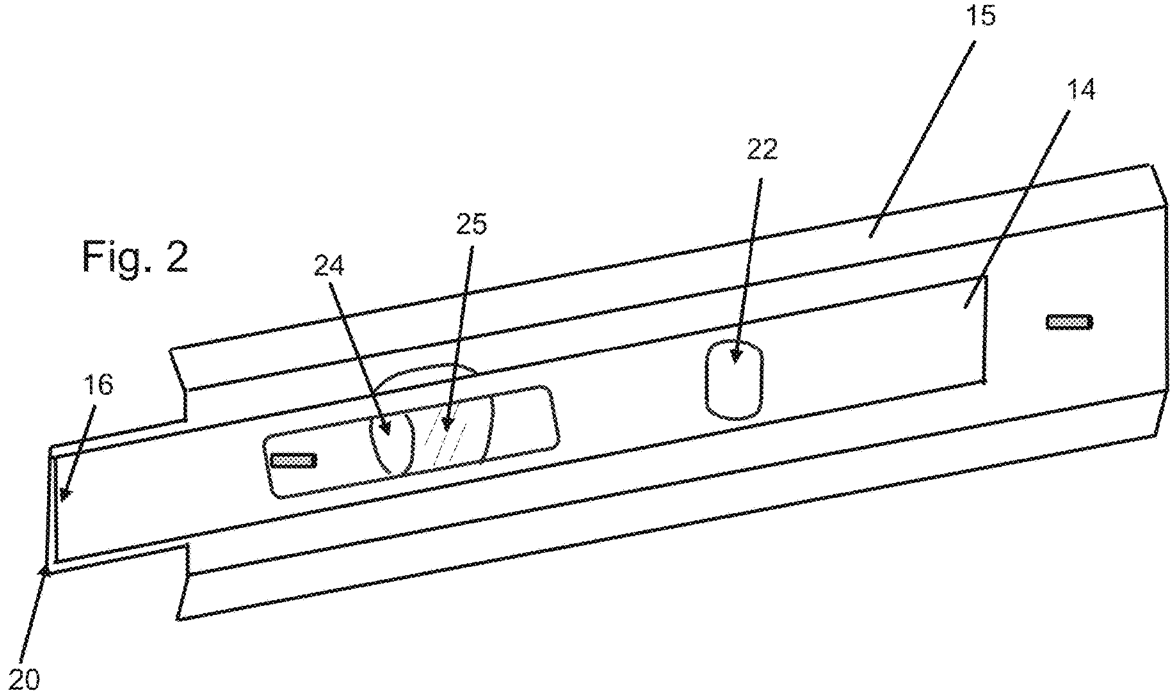
FIG. 2 is a rear perspective view of the lock structure of FIG. 1.
Figure 3:
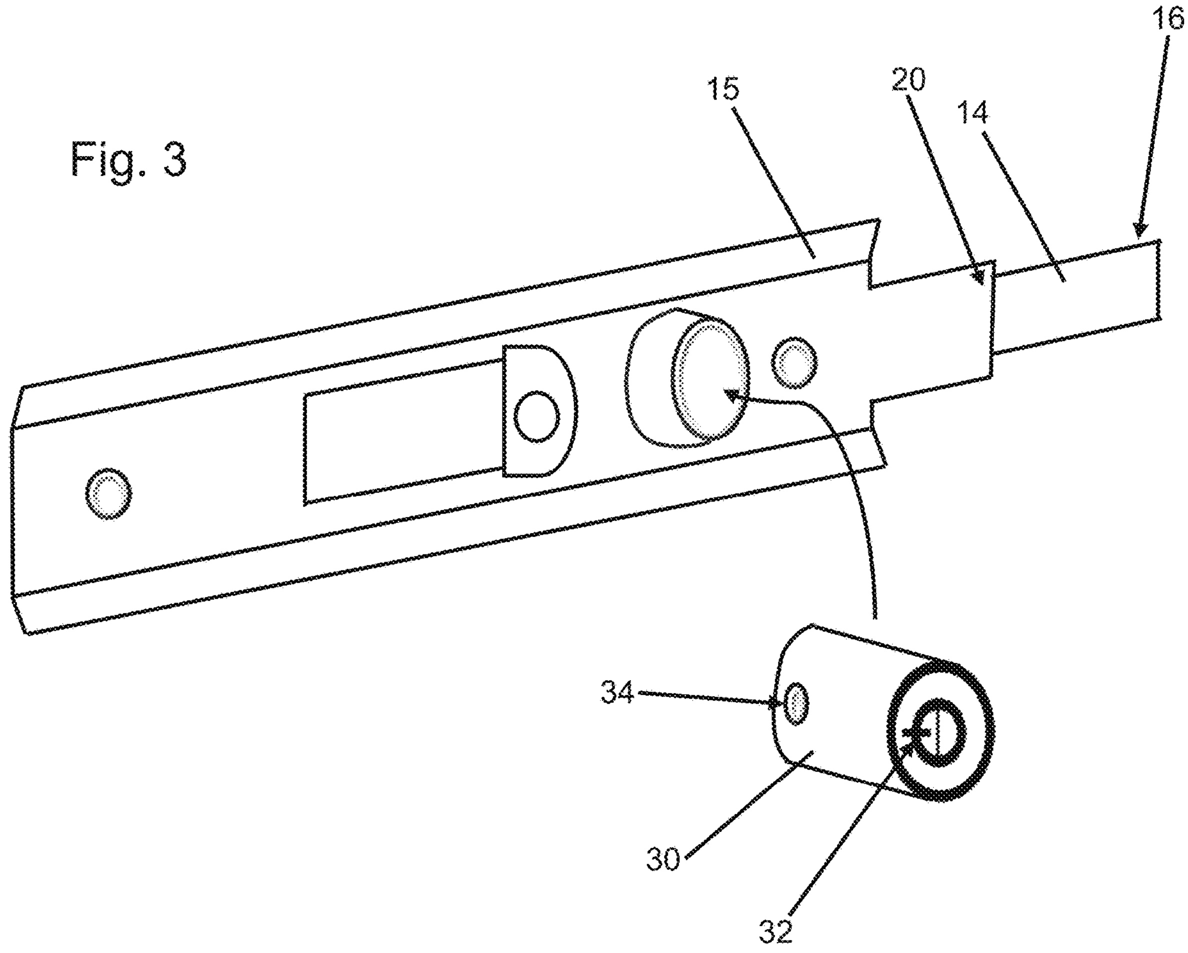
FIG. 3 is a front perspective view of the lock structure of FIG. 1 in a lockable position and with an exemplary cylinder lock prior to insertion of the cylinder lock in the lock structure.

As shown in FIGS. 1 through 3, a lock structure 12 is provided with a latch or hasp 14 maintained within a plate frame 15. The hasp 14 can be slid between a lockable position and an unlockable position. In the lockable position, one end 16 of the hasp 14 slides beyond the end wall 20 of the plate frame 15 and into a mating slot in a door frame, wall or external structure (not shown) adjacent to the plate frame 15. In the lockable position, an opening 22 in the hasp 14 is aligned with an opening 24 in the plate frame 15. Opening 24 can be provided as part of a cylindrically or other shaped extension 25 from the plate frame 15, as will be appreciated by one of ordinary skill. When the hasp 14 is slid back to the unlockable position, the opening 22 in the hasp 14 is not aligned with the opening 24 in the plate frame 15, and therefore the door to which this lock structure 12 is provided cannot be locked.

In the lockable position as shown in FIG. 3, a cylinder lock 30 can be inserted into the openings 22, 24 in the plate frame 15 and the hasp 14. The cylinder lock 30 can have a keyed groove 32 which can receive an external key (not shown). When the key is in the groove of the cylinder lock 30, the key can be turned to lock the cylinder lock 30 in place within the openings 22, 24 of the hasp 14 and plate frame 15 via a detent 34 or other locking mechanism on the cylinder lock 30 engaging an internal part of the lock structure 12. The locking of the cylinder lock 30 effectively maintains the hasp 14 in the locked position where it cannot be moved. The key can then be removed with the cylinder lock 30 left in place in the lock structure 12. When a user desires to open the lock, the key is inserted into the key groove and turned to release the cylinder lock 30 from the openings 22, 24. With the cylinder lock removed, the hasp 14 can be slid to allow the door to be opened.

In many environments, it is desirable to continue to employ the locking structure as in FIG. 1, but with a different type of lock. However, locks such as padlocks cannot be directly employed in the environment of FIGS. 1 through 3 because the geometries of the hasp 14, plate frame 15 and openings 22, 24 do not permit a shackle from a padlock to fit through the opening and securely engage the opening on the padlock body according to traditional padlock operation.

Figure 4:
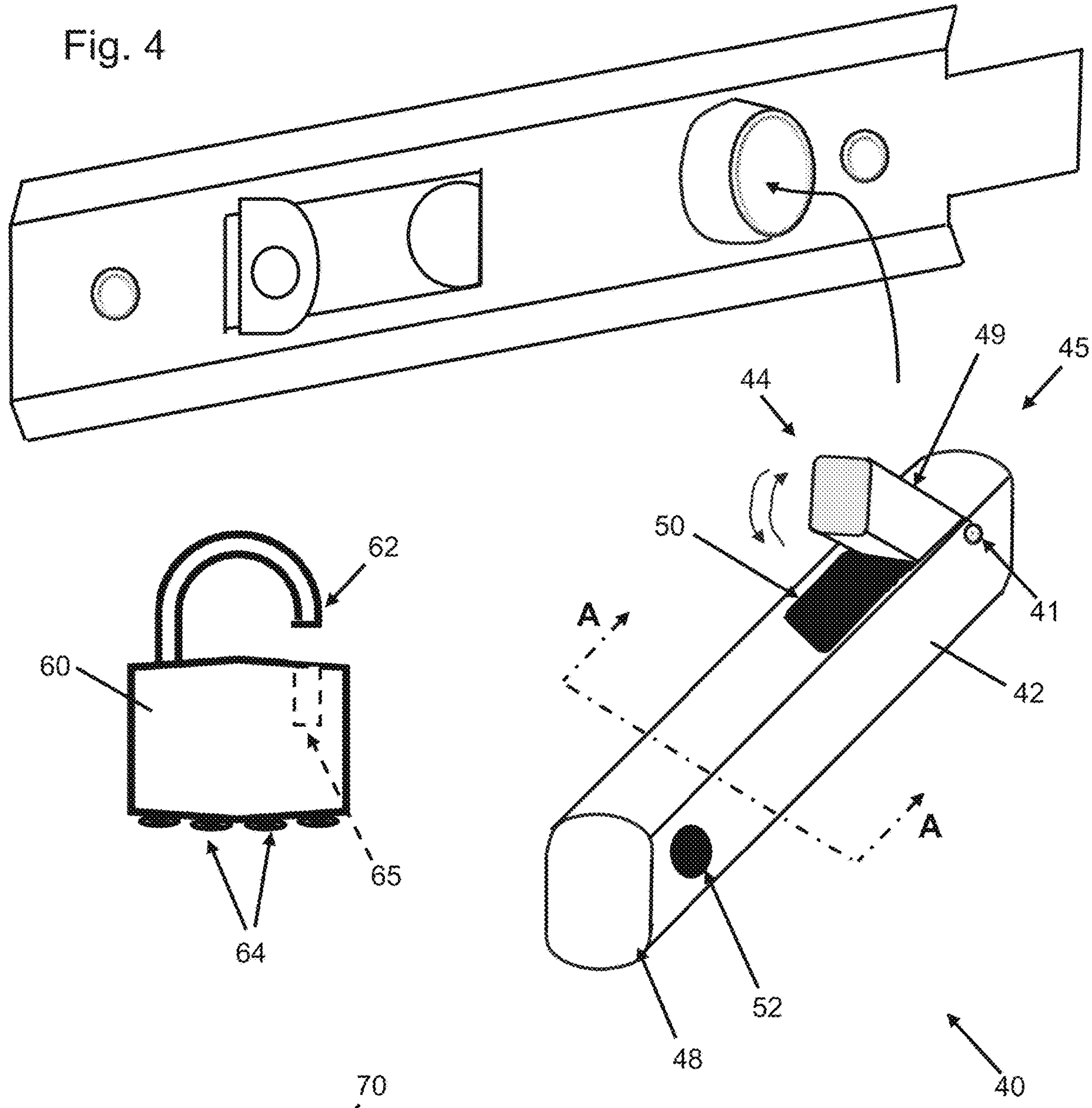
FIG. 4 is a front perspective view of a lock structure with an exemplary lock adapter according to embodiments of the present disclosure, prior to insertion of the lock adapter in the lock structure.
Figure 6:
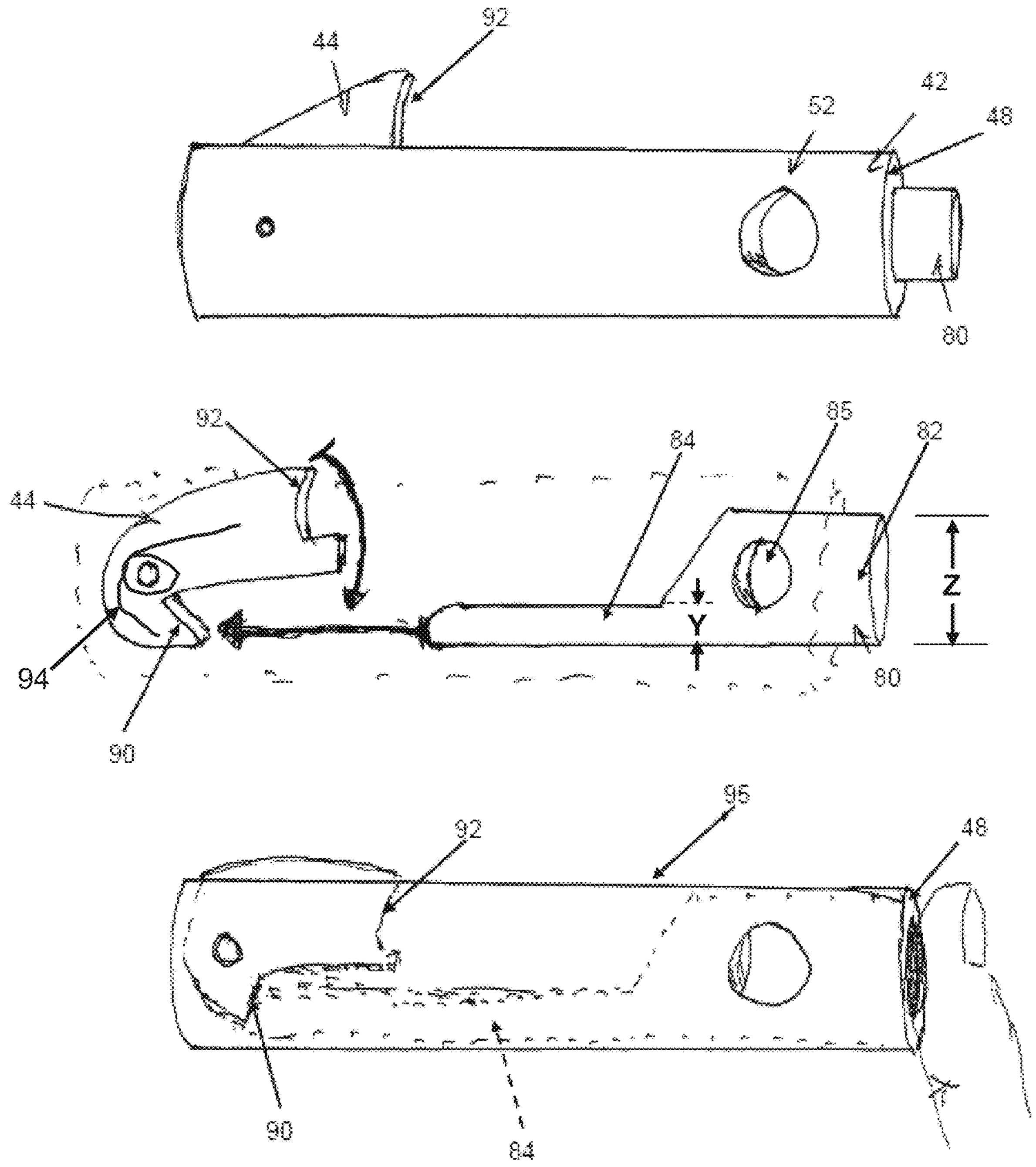
FIG. 6 is a series of perspective drawings showing a plunger and operation thereof in accordance with embodiments of the present disclosure.

According to embodiments of the present disclosure, such as shown in FIG. 4, for example, a lock adapter 40 is provided with a body 42 and a biased catching mechanism 44 operable to fit within the body 42 of the lock adapter 40 near a back end 45 of the lock adapter 40 when in the retracted position and further operable to extend outwardly of the lock adapter body 42 when in the extended position. It will be appreciated that a spring 94 or other biasing mechanism can be employed to retain the catching mechanism 44 in the extended position at rest, such as shown in FIGS. 4 and 6. The spring 94 can be maintained in the hollow body 42 of the lock adapter 40 for biasing the catching mechanism 44 in the extended position. The spring 94 may be positioned below the extended portion 92 of the catching mechanism 44 or may be positioned behind the bottom surface 90 of the catching mechanism 44, for example. In various embodiments, such as shown in FIG. 6, the spring 94 is maintained as a wound coil within the catching mechanism 44.

The catching mechanism 44 can be pivotably secured by a screw 41 or similar device at the back end 45 of the lock adapter body 42 adjacent an aperture or opening 50 formed in the lock adapter body 42, wherein the aperture 50 is aligned with an opening extending through the catching mechanism 44, which permits the catching mechanism 44 to pivot back and forth during operation as described herein. The lock adapter body 42 can further be formed with an aperture 52 extending radially through the body 42 proximate a front end 48 of the lock adapter body 42. The aperture 52 is operable to receive a shackle such as a shackle 62 on a padlock 60. The padlock can be a combination lock with combination rollers 64 according to padlock designs known in the art.

Figure 5:
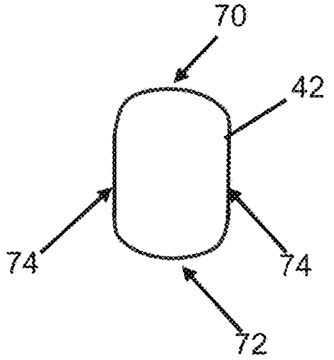
FIG. 5 is a cross-sectional view of the lock adapter taken along the line A-A of FIG. 4.

In addition to the above, the lock adapter body 42 can be formed so as to be insertable through the hasp opening 22 and the plate frame opening 24 of a lock structure as indicated by the arrow in FIG. 4, for example. In various embodiments, the lock adapter body 42 is slidingly engageable with the lock structure 12 and fits through the openings 22, 24 when the lock structure is in the lockable position. It will be appreciated that the cross-sectional profile of the lock adapter body 42 can be round, oval or another shape in order to sufficiently fit through the opening(s) in the environment where operated. In various embodiments, the cross-sectional profile is rounded at top 70 and bottom 72 surfaces and substantially linear at the side surfaces 74, as shown in FIG. 5, for example. Such shape can be referred to as an elliptical cylindrical shape. The lock adapter body 42 can be hollow in one or more segments, such as at least in the part 50 which retains the catching mechanism 44. The lock adapter body 42 can further be formed as a solid body other than the segment which receives the catching mechanism 44 and other than the aperture 52.

In operation, once a hasp in a lock structure such as hasp 14 in lock structure 12 is slid into the lockable position with the hasp opening 22 aligned with the plate opening 24, the back end 45 of the lock adapter 40 can be inserted through the openings 22, 24. As the lock adapter 40 is inserted into the openings 22, 24, the walls defining the openings 22, 24 engage the back/top (indicated at 49 in FIG. 4) of the catching mechanism 44, influencing the catching mechanism 44 against its bias and into a position within the cavity 50 of the lock adapter body 42, thereby permitting the catching mechanism 44 to be fully inserted through the openings 22, 24. Once the catching mechanism 44 is inserted through the wall surrounding the openings 22, 24, the catching mechanism 44 springs back to its resting position extended from the body 42 of the lock adapter 40. In this position, the lock adapter 40 is maintained in position against the back of the hasp 14 and/or plate frame 15 and cannot be pulled back through the openings 22, 24. A shackle (e.g., 62) of an external lock (e.g., 60) can then be inserted through the aperture 52 in the front end 58 of the lock adapter 40 and secured within a shackle arm opening 65 of the external lock 60.

According to various embodiments as illustrated in FIG. 6, a plunger 80 can be provided and employed to facilitate manual retraction of the catching mechanism 44. Such manual retraction may be desirable, for example, when a user wishes to retrieve the lock adapter 40 from its previously installed position and has removed any shackle of an external lock, such as shackle 62 of lock 60. In such embodiments, the lock adapter body 42 is hollow and retains the plunger 80 within a hollow cavity thereof. As shown in FIG. 6, the plunger 80 can be provided with a plunger body 82 and a plunger neck 84, with an opening 85 formed in the plunger body 82 to align with the aperture 52 in the lock adapter body 42. The plunger neck 84 is formed so as to be capable of engaging a bottom surface 90 of the catching mechanism 44 within the cavity of the lock adapter body 42. For example, the plunger neck 84 can be formed with a radial thickness Y that is one-half or less than the radial thickness Z of the plunger body 86, so as to permit operation as disclosed herein. The geometric shape of the catching mechanism 44 can vary but as shown in FIG. 6, it includes the bottom surface 90 which may optionally be angled such that, when the plunger 80 is depressed from the outside of the lock adapter body 42, the plunger 80 slides within the lock adapter body 40 and impacts the bottom surface 90 that faces the plunger neck 84. As the plunger 80 is depressed, the plunger neck 84 exerts a force on the bottom surface 90 of the catching mechanism 44 that causes the catching mechanism 44 to rotate about its axis and against its biased position as described earlier. The extended portion 92 of the catching mechanism 44 is then rotated downward and into the opening 50 of the lock adapter body 42 where it maintains a substantially flat position aligned with the top surface 95 of the lock adapter body 42. In such position, the lock adapter 40 can be pulled out by the operator through the hasp opening 22 and the plate frame opening 24. Releasing the plunger 80 allows the spring or other biasing mechanism to rotate the catching mechanism 44 upwards and push the plunger 80 back through the end 48 of the lock adapter body 42.

As shown in the embodiment of FIGS. 7 through 11, a cylinder lock 100 is provided with a main body component 102 having a front face 104 and a back face 106. A locking arrangement 108 is accessible via the front face 104 of the main body component 102. The locking arrangement 108 can include, for example, a combination dial and/or rollers 109 and a rotary knob 111 for engaging or disengaging a locking element in accordance with embodiments of the present disclosure. An extension component 110 is provided with a first end 112 extending from the back face 106 of the main body component 102 and a second end 114 opposite the first end 112, wherein the second end 114 has a rear surface 116. According to various embodiments, the extension component 110 is integrally formed with the main body component 102 and as such, the cylinder lock 100 in such embodiments is a monolithic device, which may be referred to herein as the main body component 102. In various embodiments, at least a portion of the extension component 110 can be formed with a cylindrical or elliptically cylindrical cross-section to facilitate entry through a similarly shaped opening in a plate frame as described elsewhere herein.

The back face 106 can also be integrally formed with the front face 104, or in various embodiments, can be secured such as with machine screws 115 or other attachment mechanisms. As further shown in FIGS. 7 through 11, a locking element 120 is secured such that a head 122 thereof is movable at a position outside of the main body component 102 and/or extension component 110 adjacent the second end 114 of the extension component 110. In various embodiments, the locking element 120 is secured to and/or adjacent the rear surface 116 of the second end 114 of the extension component 110. In various embodiments, the locking element 120 is formed with a hollowed cylindrical body 125, a hollowed cylindrical foot 127 and a head 122, wherein the body 125 and foot 127 are rotatable within a cylindrical cavity 150 of the extension component 110. The cylindrical body 125 and foot 127 can be formed as hollow with an internal cavity 128 for receiving a spindle 160. The spindle

160 can be secured within the cavity 128 at one end 162 and secured at a second end 164 of the spindle 160 within a cavity 170 of the knob 111. Securing of the spindle 160 can be via a fixed connection or by friction fit, for example. The locking element 120 can be maintained within the cavity 150 of extension component 110 via a fixed connection such as a screw with optional washer, wherein the screw threadedly engages a threaded opening accessible in the end 162 of the spindle 160. Alternatively, the locking element 120 can be maintained within the cavity 150 via friction fit. For example, cavity 150 can be formed with an axially outward section 151 and an axially inward section 152, wherein the axially outward section 151 has a smaller diameter than the diameter of the axially inward section 152. The foot 127 of locking element 120 can have a larger diameter than the body 125 of locking element 120, and the foot 127 can be rotatably maintained within the axially inward section 152 of the cavity 150 of the extension component 110 whereas the body 125 of locking element 120 can be rotatably maintained within the axially outward section 151 of the cavity 150 of the extension component 110. Further the head 122 of the locking element 120 can be provided with a diameter larger than the axially outward section 151 of the cavity 150. As such, the head 122 and foot 127 of the locking element 120 become locked in position and incapable of axially moving within or outside of the cavity 150 according to various embodiments of the present disclosure. Nevertheless, the locking element 120 is rotatable when the knob 111 is rotated due to the connection of the knob 111 and locking element 120 to the spindle 160.

Figure 11:
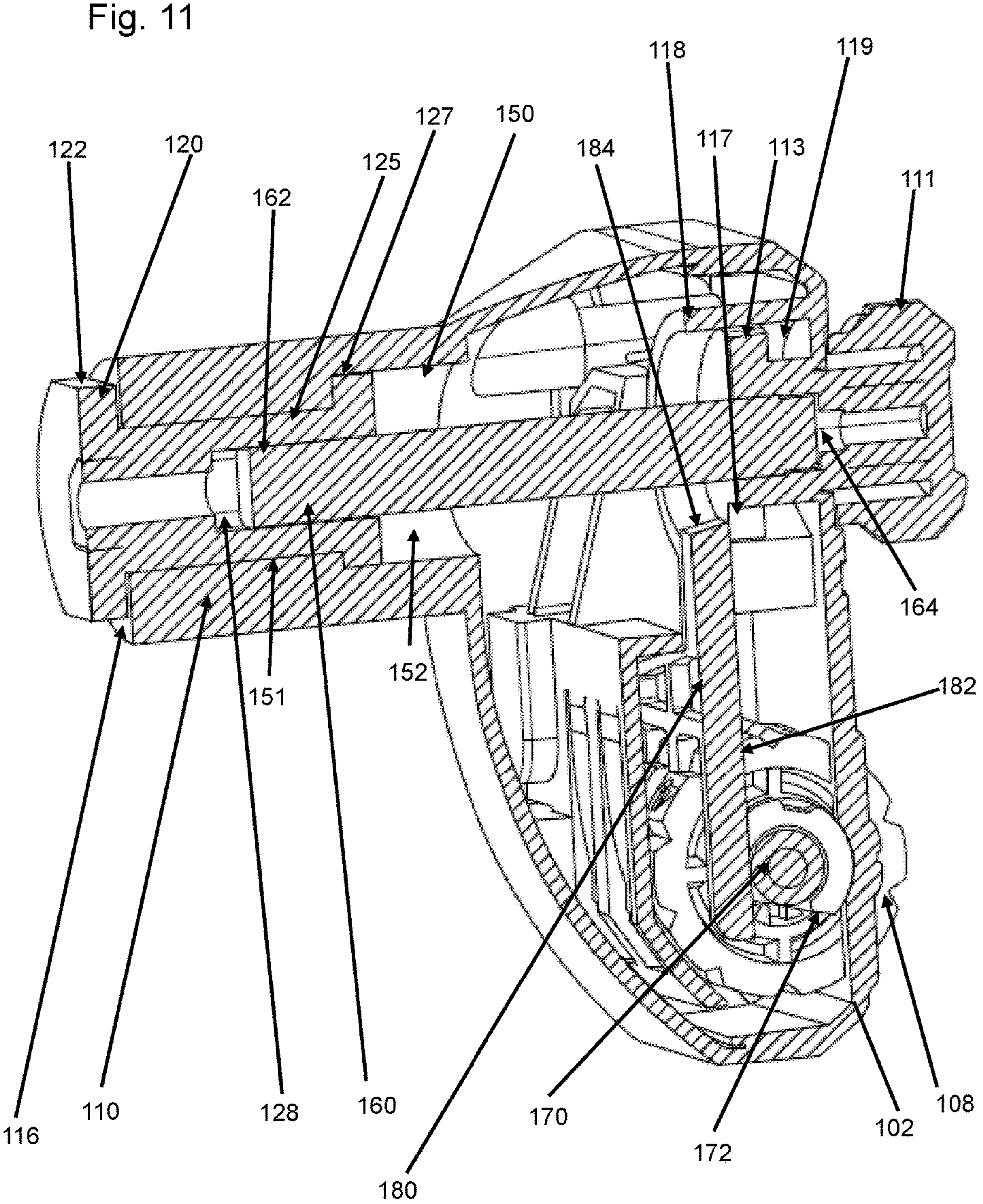
FIG. 11 is a perspective view of a cross-section of the cylinder lock taken along the line 11-11 of FIG. 8.

In various embodiments, the spindle 160 can be permitted to rotate or restricted from rotation due to engagement of the knob 111 and/or a cam 170 of the locking arrangement 108 with a control lever 180. The cam 170 and control lever 180 are maintained within the cavity of the main body component 102 and can both be considered part of the locking arrangement 180. As shown in FIG. 11, the cam 170 can be mechanically engaged with the locking arrangement 108 and can be formed with a flat edge 172. When the locking arrangement 108 is locked, the cam 170 is in a position where the flat edge 172 is in full mechanical communication with an interior face 182 of the control lever 180. In such position, the control lever 180 is free to slide within the hollowed body of the main body component 102 such that top end 184 of the control lever 180 is aligned with a leg 113 of knob 111. In such position, the notched segment 117 of the leg 113 of knob 111 engages the top end 184 of the control lever 180 such that the knob 111 is prevented from rotating, which prevents the spindle 160 from rotating, which in turn prevents the locking member 120 from rotating. Thus, when the locking arrangement 108 is locked, such as, for example, when the combination is not set to the proper combination for unlocking the lock, the knob 111 will not turn and thus the locking member 120 cannot rotate to a position which will permit unlocking of the lock. When the proper combination is input to the locking arrangement 108, the cam 170 is rotated so as to move the control lever 180 so as to disengage the notched segment 117 of the leg 113 of the knob 111, which permits the knob 111 to be rotated, thereby rotating the spindle 160 and locking member 120. It will be appreciated that the main body component 102 can be formed with a sleeve 118 defining a cavity 119 within which the knob leg 113 can rotate.

In various embodiments, at least the second end 114 of the extension component 110 has a cross-sectional shape of an elliptical cylinder, such as the shape shown in FIG. 5, including substantially flat or planar side surfaces 117. Further, the locking element 120 can be formed with the head 122 having a cross-sectional shape of an elliptical cylinder, such as the shape shown in FIG. 5. In this way, the movable locking element 120 can be moved from a position A in FIG. 9, where the locking element head 122 is not aligned with the second end 114 of the extension component 110 to a position B in FIG. 10, where the locking element head 122 is aligned with the second end 114 of the extension component 110. When in position B, the cylinder lock 100 including locking element 120 can be fully removed from a lock structure and/or hasp of a lock structure such as the lock structure 12 shown in FIGS. 1 through 3, whereas in position A, the locking element head 122 provides a catch for the back or internal part of a lock structure or hasp of a lock structure, thereby preventing removal of the cylinder lock 100 and locking element 120.

In various embodiments, the locking arrangement 108 is operable to move the locking element 120 from a locking position (e.g., position B in FIG. 10) to an unlocking position (e.g., position A in FIG. 9) and vice versa. For example, once the correct combination is input into the combination dial and/or rollers 109, the knob 111 can be rotated, thereby rotating internal components the spindle 160 within a cavity of the main body component 102 and extension component 110 of the cylinder lock 100, wherein the spindle 160 is part of or is connected to the locking element 120. If the correct combination is not used, the knob 111 can be locked in position and unable to move the locking element 120. It will be appreciated that movement of the rotatable knob 111 moves the locking element 120 either into or out of axial alignment with the second end 114 of the extension component 110.

Figure 12:
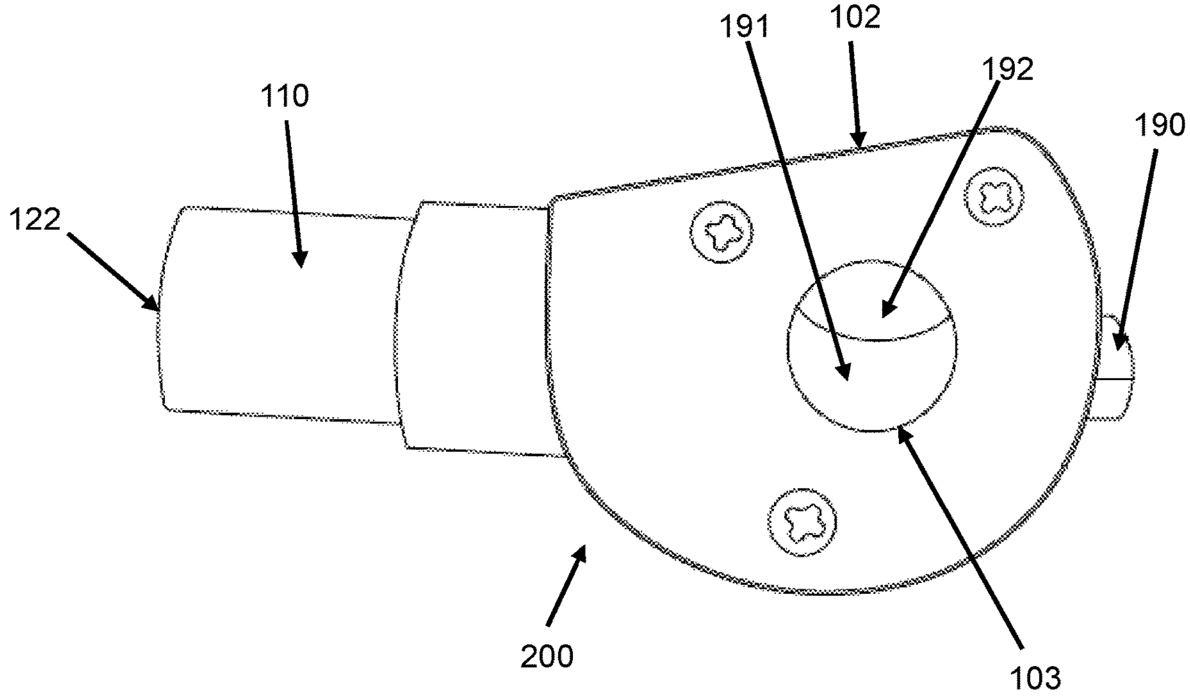
FIG. 12 is a right-side view of a cylinder lock according to embodiments of the present disclosure.

In other embodiments of a cylinder lock 200 according to the present disclosure as shown in FIG. 12, the main body component 102 and extension component 110 are connected or formed as a monolithic device with a hollow interior. A rotating knob 190 extends outwardly of the main body component 102 and is provided with an opening 192 therein that can be rotated into and out of alignment with an opening 103 in the main body component 102. When the openings 103 and 192 are fully aligned, a shaft of a lock can be inserted through the main body component 102 and a spindle 191 secured to the knob 190. When there is no shaft inserted through the openings 103, 192, the knob 190 can be rotated and a locking element head 122 secured to the knob body 191 can be rotated so as to permit locking and unlocking of the cylinder lock 200 from a plate as described elsewhere herein.

The present disclosure describes numerous embodiments, and these embodiments are presented for illustrative purposes only. These embodiments are described in sufficient detail to enable those skilled in the art to practice the embodiments, and it will be appreciated that other embodiments may be employed and that structural and other changes may be made without departing from the scope or spirit of the presently disclosed embodiments. Accordingly, those skilled in the art will recognize that embodiments of the present disclosure may be practiced with various modifications and alterations. Although particular features of the presently disclosed embodiments can be described with reference to one or more particular embodiments or figures that form a part of the present disclosure, and in which are shown, by way of illustration, specific embodiments, it will be appreciated that such features are not limited to usage in the one or more particular embodiments or figures with reference to which they are described. The present disclosure is thus neither a literal description of all embodiments nor a listing of features of any embodiments that must be present in all embodiments.

The invention claimed is:

1. A cylinder lock, comprising:

a lock adapter comprising a hollow body with a top surface, a bottom surface and two side surfaces, wherein the top surface is formed with an opening therein;

a catching mechanism maintained at least partially within the hollow body of the lock adapter, wherein the catching mechanism is secured so as to be biased in an extended position whereby a catching portion of the catching mechanism extends through the opening in the top surface of the lock adapter;

a plunger at least partially maintained within the hollow body of the lock adapter, wherein the plunger comprises a front end extending outwardly of a front end of the lock adapter; and wherein, upon depression of the plunger front end, the plunger engages the catching mechanism so as to rotate the catching portion to a position entirely within the hollow body of the lock adapter.

2. The cylinder lock of claim 1, wherein the lock adapter body is formed with at least one aperture extending radially therethrough.

3. The cylinder lock of claim 2, wherein the at least one aperture comprises an aperture aligned with an opening extending through the catching mechanism.

4. The cylinder lock of claim 3, further comprising a spring maintained in the hollow body of the lock adapter for biasing the catching mechanism in the extended position.

5. The cylinder lock of claim 2, wherein the at least one aperture comprises an aperture for receiving a shackle of a lock.

6. The cylinder lock of claim 2, wherein the at least one aperture comprises a first aperture aligned with an opening extending through the catching mechanism and a second aperture for receiving a shackle of a lock.

7. The cylinder lock of claim 1, wherein the plunger further comprises a plunger body and a plunger neck, wherein the plunger neck comprises a radial thickness that is less than a radial thickness of the plunger body.

8. A cylinder lock, comprising:

a lock adapter comprising a front end, a back end opposite the front end and a top surface between the front end and the back end, wherein the lock adapter is formed with an opening therein;

a catching mechanism pivotably secured to the lock adapter, wherein the catching mechanism is secured so as to be biased in an extended position whereby a catching portion of the catching mechanism extends above the top surface of the lock adapter;

a plunger comprising a front end extending outwardly of the front end of the lock adapter; and wherein, upon depression of the front end of the plunger, the plunger engages the catching mechanism so as to pivot the catching portion to a position aligned with the top surface of the lock adapter.

9. The cylinder lock of claim 8, wherein the opening comprises at least one aperture extending radially therethrough.

10. The cylinder lock of claim 8, wherein the opening comprises an aperture aligned with an opening extending through the catching mechanism.

11. The cylinder lock of claim 8, wherein the opening comprises an aperture for receiving a shackle of a lock.

12. The cylinder lock of claim 8, wherein the opening comprises a first aperture aligned with an opening extending through the catching mechanism and a second aperture for receiving a shackle of a lock.

13. The cylinder lock of claim 8, wherein the plunger comprises a plunger body and a plunger neck, wherein the plunger neck comprises a radial thickness that is less than a radial thickness of the plunger body.

14. The cylinder lock of claim 8, further comprising a spring for biasing the catching mechanism in the extended position.

15. A cylinder lock, comprising:

a lock adapter comprising a hollow body and a top surface between opposing front and back ends, wherein the lock adapter is formed with an aperture;

a lock comprising a shackle, wherein the shackle is extendable through the aperture of the lock adapter; and a catching mechanism pivotably secured to and within the hollow body of the lock adapter between an extended position above the top surface of the lock adapter and a retracted position aligned with or below the top surface of the lock adapter.

16. The cylinder lock of claim 15, further comprising:

a plunger comprising a front end extending outwardly of a front end of the lock adapter, wherein, upon depression of the front end of the plunger, the plunger engages the catching mechanism so as to pivot the catching portion to a position aligned with the top surface of the lock adapter.

17. The cylinder lock of claim 16, wherein the plunger further comprises a plunger body and a plunger neck, wherein the plunger neck comprises a radial thickness that is less than a radial thickness of the plunger body.

18. The cylinder lock of claim 15, wherein the lock adapter is further formed with a pivot line aperture aligned with an opening extending through the catching mechanism.

* * * * *